May 30, 1933.     R. W. CLIFFORD     1,911,807
CROSSHEAD
Filed April 25, 1932
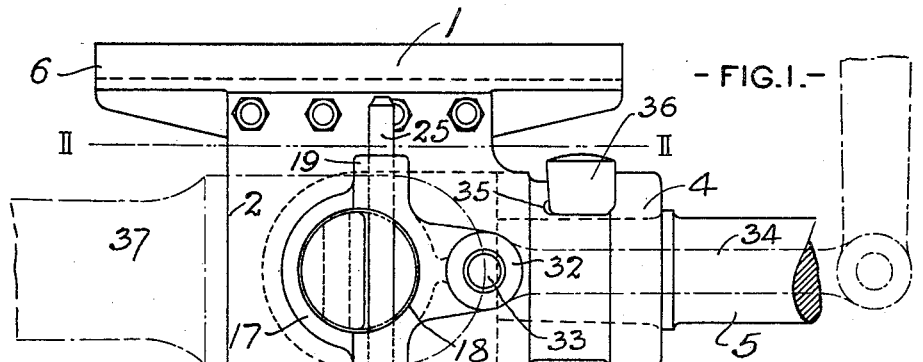
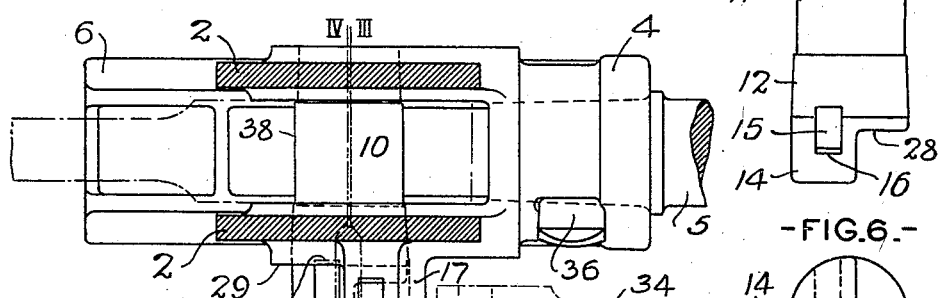
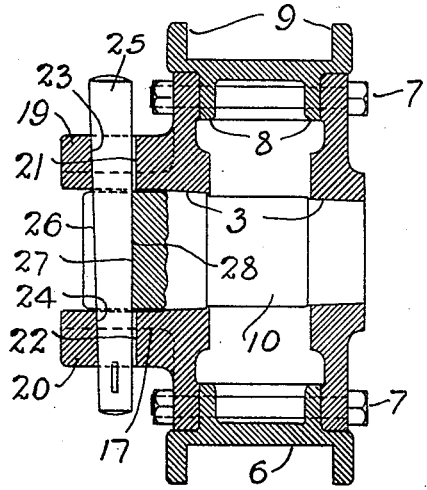
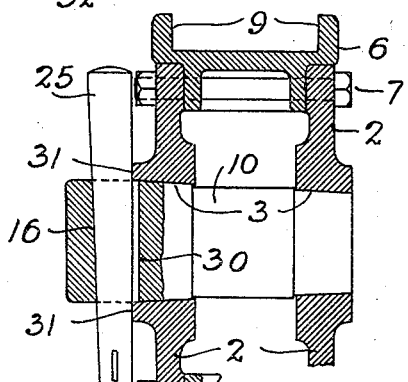
INVENTOR
Roger W. Clifford
BY S. C. Yeaton
ATTORNEY Patented May 30, 1933

1,911,807

UNITED STATES PATENT OFFICE

ROGER W. CLIFFORD, OF SCHENECTADY, NEW YORK

CROSSHEAD

Application filed April 25, 1932. Serial No. 607,245.

This invention relates to the class of apparatus known as crossheads.

More particularly, the invention relates to means for holding a wrist pin securely in place in a crosshead and for retracting the pin therefrom.

In ordinary locomotive practice, the piston rod of a working cylinder is connected to a main drive rod, which transposes the reciprocating motion of the piston into the revolving motion of the driving wheels, by means of a crosshead, the main rod being connected to the crosshead by a wrist pin which passes through the crosshead and through an eye formed on the forward end of the rod. To securely hold the wrist pin in place, keyways are provided in the crosshead and wrist pin, and a tapered key is disposed in the keyways.

An object of the present invention is to provide a novel and improved crosshead, wrist pin and key construction.

Another object is to provide such a construction, wherein the key will serve to securely hold the wrist pin in place when inserted in the keyway and will serve as an extractor for the wrist pin when disposed in another position on the crosshead.

A further object is to provide such a construction wherein the number of parts commonly used will be reduced and a saving in both space and in weight as well as in manufacturing expense will be effected.

A further object is to provide a novel crosshead construction embodying a pin bearing for a combination lever link.

In the prior art crosshead structures have been employed which embodied a boss formed on one side of the body of the crosshead, surrounding the wrist pin bore, the boss being provided with a vertical slot in which a gib and a key were disposed for holding the wrist pin in place when assembled in one way, and for removing the pin when assembled in a reverse way. The present invention obviates the use of a gib and thereby effects a saving in space, weight and cost.

Referring in detail to the drawing, wherein there is exemplified an embodiment of the present invention, Figure 1 is a side elevation of a locomotive engine crosshead construction embodying the instant invention; Fig. 2 is a section on the line II—II of Fig. 1; Fig. 3 is a section on the line III—III of Fig. 2; Fig. 4 is a section on the line IV—IV of Fig. 2; Fig. 5 is a plan view of the wrist pin; and Fig. 6 is an end view of the wrist pin.

In the practice of the present invention, the embodiment shown is exemplified as applied to a locomotive crosshead, indicated generally by the numeral 1. The crosshead is of a usual type and comprises outside and inside vertical walls 2, each having a tapered bore 3, formed therein, for the reception of a wrist pin, hereinafter to be more fully described. A cylindrical portion 4 connects the walls 2 at the forward ends thereof, and is formed integral with the walls and provided with a bore for the reception of an end of a piston rod 5, in the usual manner. To the walls 2, are secured upper and lower shoes or walls 6, by bolts 7, which are passed through the outside and inside walls 2, and through flanges 8 formed on the inner sides of the upper and lower shoes, in the usual manner. Guide flanges 9 are formed on the edges of the shoes 6 in the usual manner, and the flanges 8 are spaced inwardly from the edges, so that the outer surfaces of the walls 2, are substantially flush with the outer surfaces of their adjacent flanges 9.

A wrist pin 10 is disposed in the bores 3, transversely of the crosshead, and comprises a central cylindrical portion 11, and two frusto-conical portions 12 and 13 which fit the tapered bores of the outside and inside walls, respectively. The pin is provided with an end portion 14, which extends beyond the outside wall of the crosshead when the pin is in assembled position. The portion 14 extends across approximately one-half of the wrist pin, and is provided with a slot 15 having a slanting outside wall 16.

On the outside wall 2, of the cross head, a boss 17 is formed. The boss is provided with a bore 18, which is aligned with the bores 3 in the outside and inside walls, and through which bore also, the wrist pin 10 is passed. The inner portion of the bore 18 is beveled to coincide with the bore 3 of the outside wall 2. One side of the boss is extended outwardly and is provided with vertical projections 19 and 20, in which aligned slots 21 and 22 are formed. The outside walls 23 and 24 of the slots 21 and 22, respectively, slant inwardly from top to bottom.

A key 25 is provided for the boss and pin, and when assembled in one or the other of its positions, extends either through the slots of the boss or the slot of the pin. The key is formed with an outside tapered face 26 which, when the key is extended through the slots 21 and 22 of the boss, bears against the respective slanting walls 23 and 24 of said slots. The inside face 27 of the key is straight, and in this position bears against the end of the wrist pin at 28, (Fig. 3). The lower end of the key is provided with a slot for the insertion of a split key for retaining the key in fixed position. The key is of such thickness with relation to the slots 21 and 22 that, when the key is in the engaged position shown in Fig. 3, there is a clearance between the inside face 27 of the key and the opposite or inner walls of said slots.

In operation, to securely hold wrist pin 10 in tightly engaged position in the bores 3, the key 25 is inserted through the slots 21 and 22 and upon forcing the key downwardly, its tapered face 26 will bear against the tapered surfaces 23 and 24 of the slots while its straight face 27 bears against the end of the pin 10 at 28, the downward movement of the key forcing the wrist pin inwardly so that the surfaces of the frusto-conical portions 12 and 13, securely engage the surfaces of the tapered bores 3 in the side walls of the crosshead.

The portion 29 of the boss, i. e., the side of the boss adjacent the aforedescribed outwardly extended side thereof provided with the vertical projections 19 and 20, extends outwardly only a very limited distance from the wall of the crosshead, so that when the wrist pin is in engaged position, its end 14 extends beyond the outside of the portion 29, and its slot 15 is disposed only slightly within the boss as indicated at 30. It will thus be apparent that when the key 25 is inserted in the slot 15 of the pin 10, its straight face 27 will bear against the outer face 31 of the portion 29 of the boss, and its tapered surface 26 will bear against the tapered surface 16 of the slot 15 (Fig. 4). Thus, with the key in this position, a forcing of the same downward will effect an outward movement of the pin, there being sufficient clearance between the straight face 27 of the key and the opposite wall of the slot 15 to permit a slight outward movement of the pin relative to the crosshead during the said downward movement of the key, thereby loosening the pin so that it may be readily withdrawn.

Integrally formed with the boss 17, a lug 32 extends to one side thereof. The lug 32 is provided with a bore 33 providing a bearing for the pivotal connection of an end of a combination lever link 34. It will, of course, be understood that while this lever link bearing feature is illustrated in the present embodiment of the invention, it constitutes an independent feature of the present invention, and this feature and the pin and key feature may be used either together, as shown, or independently, as desired. A slot 35 is provided in the portion 4 of the crosshead, and a key 36 is provided in the slot, the key engaging a corresponding slot (not shown) in the piston rod and locking the piston rod and crosshead securely to each other, in the usual manner. A main drive rod 37 is indicated in Fig. 1, as connected to the crosshead by means of the wrist pin 10, the drive rod being provided in the usual manner with an eye 38 which is disposed between the outside and inside walls 2 of the crosshead, and which engages the wrist pin 10.

While there has been hereinbefore described a specific embodiment of the present invention, it will be understood that many and various changes in form and structure may be made without departing from the instant invention, and that all and any such changes and modifications as fall within the spirit of the invention as defined in the appended claims are contemplated as a part of the present invention.

Among the modifications contemplated by the present invention, for instance, the walls 23 and 24 of the slots 21 and 22, may be made vertical and the tapered side of the key made to engage a tapered end on the wrist pin at 28. On the other hand, the tapered wall 16 of the slot 15, could be substituted by a straight vertical wall and a taper provided on the sides 31 of the boss 17, and the same result effected. It will be understood that while the key has been described as having one straight side and one tapered side, this construction would be, in effect, simply a tapered key, and the key would act in the different slots without any reversing of position, in the same manner as aforedescribed, i. e., the word "straight", in this regard, may be understood to imply perpendicular to the pin axis when in position. Again, the boss 17 might be made a complete cylinder of equal length throughout and with either one wide or two adjacent keyways. Likewise, the wrist pin portion 14 might be made larger and be provided with either one wide or two adjacent keyways. It is obvious, however, that when lightness and simplicity of structure is sought, the construction illustrated is to be preferred.

The invention claimed and desired to be secured by Letters Patent, is:

1. A crosshead construction comprising a body portion having a pair of faces at one side thereof spaced from each other in directions both longitudinally and transversely of said body portion; a wrist pin engaging said body portion and having faces oppositely disposed to the first said faces providing therewith two passageways for a key; and a key adapted to wedgingly fit in either of said passageways whereby wedging movement of the key in one of said passageways will effect axial movement of the pin in one direction to tighten the engagement of the pin and body portion, and wedging movement of the key in the other passageway will effect axial movement of the pin in an opposite direction to loosen said engagement.

2. A crosshead construction comprising a body portion; a wrist pin engaged thereby and providing therewith two key passageways spaced from each other longitudinally of the body portion; and a key engageable with each of said passageways to respectively advance and retract the pin relative to the body portion, said pin being provided with an extension having a slot therethrough with a front wall constituting the front wall of the said passageway permitting said retraction, said extension providing a shoulder constituting the rear wall of the passageway for advancing the pin, and said body portion being provided with a boss having a slot with a front wall constituting the front wall of the passageway permitting said advancement, and said boss providing a shoulder constituting the rear wall of the passageway permitting said retraction.

ROGER W. CLIFFORD.